(12) United States Patent
Eberling-Fux et al.

(10) Patent No.: US 12,285,884 B2
(45) Date of Patent: Apr. 29, 2025

(54) METHOD FOR DENSIFYING A FIBROUS TEXTURE BY INJECTING A SLIP

(71) Applicant: SAFRAN CERAMICS, Le Haillan (FR)

(72) Inventors: Nicolas Eberling-Fux, Moissy-Cramayel (FR); Clément Marie Benoît Roussille, Moissy-Cramayel (FR); Mélissa Bazerque, Moissy-Cramayel (FR); Paul Carminati, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/852,931

(22) PCT Filed: Mar. 28, 2023

(86) PCT No.: PCT/FR2023/050442
§ 371 (c)(1),
(2) Date: Sep. 30, 2024

(87) PCT Pub. No.: WO2023/194673
PCT Pub. Date: Oct. 12, 2023

(65) Prior Publication Data
US 2025/0100183 A1 Mar. 27, 2025

(30) Foreign Application Priority Data
Apr. 4, 2022 (FR) ........................... 2203041

(51) Int. Cl.
*B28B 1/00* (2006.01)
*B28B 1/26* (2006.01)
*B28B 23/00* (2006.01)
*C04B 35/565* (2006.01)

(52) U.S. Cl.
CPC .......... *B28B 1/265* (2013.01); *B28B 23/0006* (2013.01); *C04B 35/565* (2013.01);
(Continued)

(58) Field of Classification Search
CPC .......... B29C 70/40; B28B 1/265; B28B 1/266
See application file for complete search history.

(56) References Cited

U.S. PATENT DOCUMENTS 5,087,193 A * 2/1992 Herbert, Jr. ........... B29C 70/544
425/389
5,152,949 A * 10/1992 Leoni .................. B29C 43/3642
425/389
(Continued)

FOREIGN PATENT DOCUMENTS

WO   WO 2018/234669 A1   12/2018
WO   WO 2019/197757 A1   10/2019

OTHER PUBLICATIONS

GR International Search Report as issued in International Patent Application No. PCT/FR2023/050442, dated Jun. 30, 2023.
(Continued)

*Primary Examiner* — Timothy Kennedy
(74) *Attorney, Agent, or Firm* — Pillsbury Winthrop Shaw Pittman LLP

(57) ABSTRACT

A method for densifying a fibrous texture made of ceramic material with a ceramic matrix used in injection equipment including a mold cavity defined between a mold and a counter-mold, the mold cavity defining an internal space, and a membrane comprising a stiffened zone, the membrane being intended to be placed between a fibrous texture present in the mold cavity and the counter-mold, and the stiffened zone of the membrane having a Young's modulus greater than 200 GPa, the method including placing a predensified fibrous texture in the mold cavity, the predensified fibrous texture having corrugations on the surface and
(Continued)

placing the membrane on the predensified fibrous texture in such a way that the stiffened zone of the membrane is in contact with the peaks of the corrugations of the predensified fibrous texture; closing the injection equipment, and densifying.

12 Claims, 3 Drawing Sheets

(52) U.S. Cl.
CPC ............... *C04B 2235/6027* (2013.01); *C04B 2235/606* (2013.01); *C04B 2235/616* (2013.01)

(56) References Cited

U.S. PATENT DOCUMENTS

| | | | | |
|---|---|---|---|---|
| 5,971,742 | A * | 10/1999 | McCollum | B29C 45/76 264/316 |
| 6,257,866 | B1 * | 7/2001 | Fritz | B29C 51/10 425/388 |
| 10,137,640 | B2 * | 11/2018 | Godon | B29C 65/48 |
| 2002/0047224 | A1 * | 4/2002 | McCollum | B29C 70/443 264/275 |
| 2004/0145095 | A1 * | 7/2004 | McCollum | B29C 70/443 264/258 |
| 2005/0184416 | A1 * | 8/2005 | McCollum | B29C 70/443 425/149 |
| 2011/0068514 | A1 * | 3/2011 | Ruiz | B29C 70/546 264/102 |
| 2022/0355554 | A1 * | 11/2022 | Kòffers | B29C 70/54 |

OTHER PUBLICATIONS

Written Opinion of the International Searching Authority as issued in International Patent Application No. PCT/FR2023/050442, dated Jun. 30, 2023.

* cited by examiner

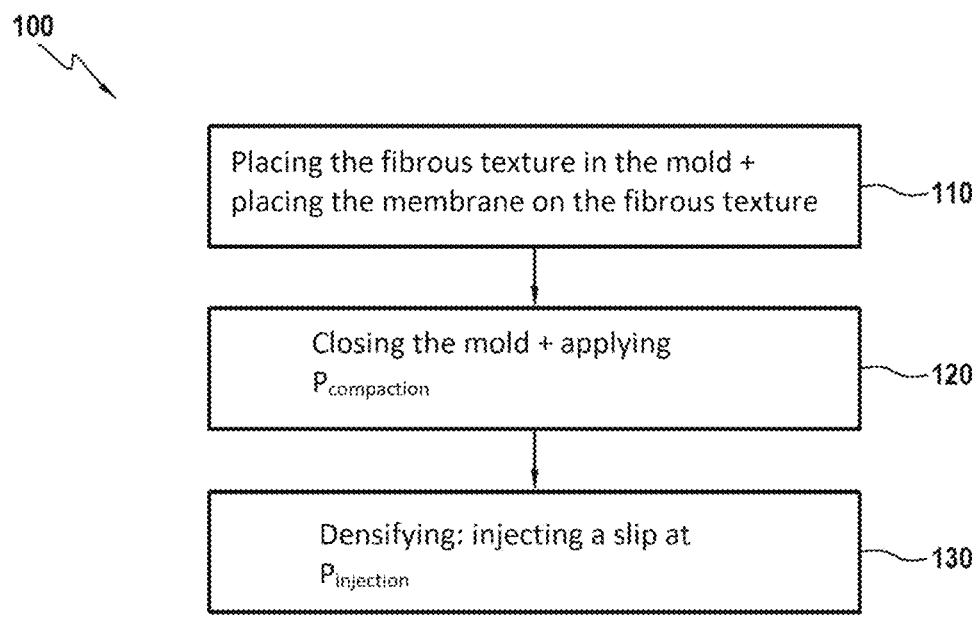
[Fig. 1]

[Fig. 2A]
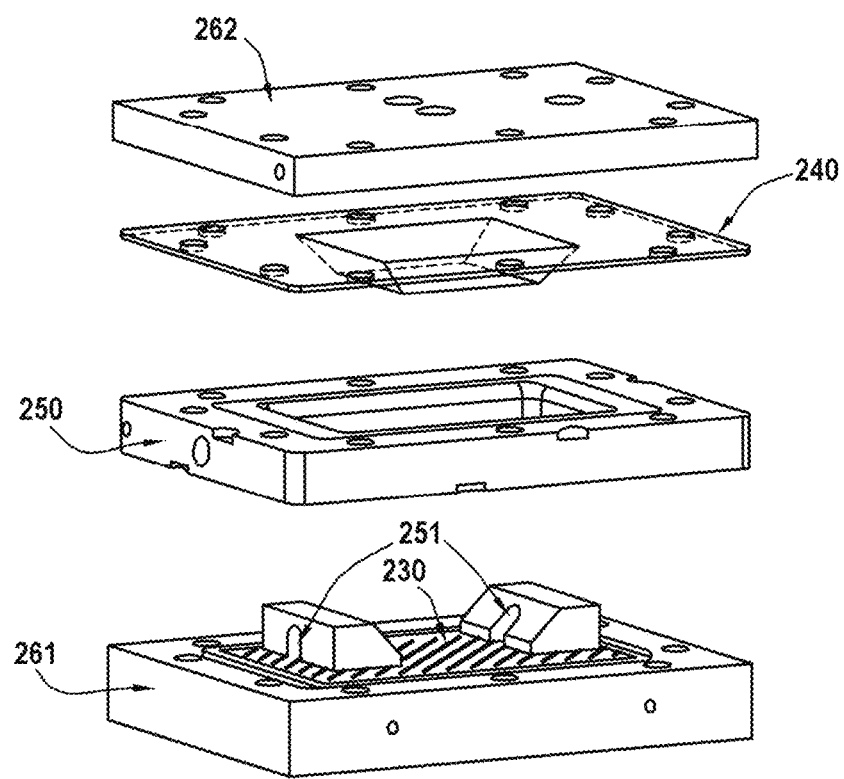

[Fig. 2B]
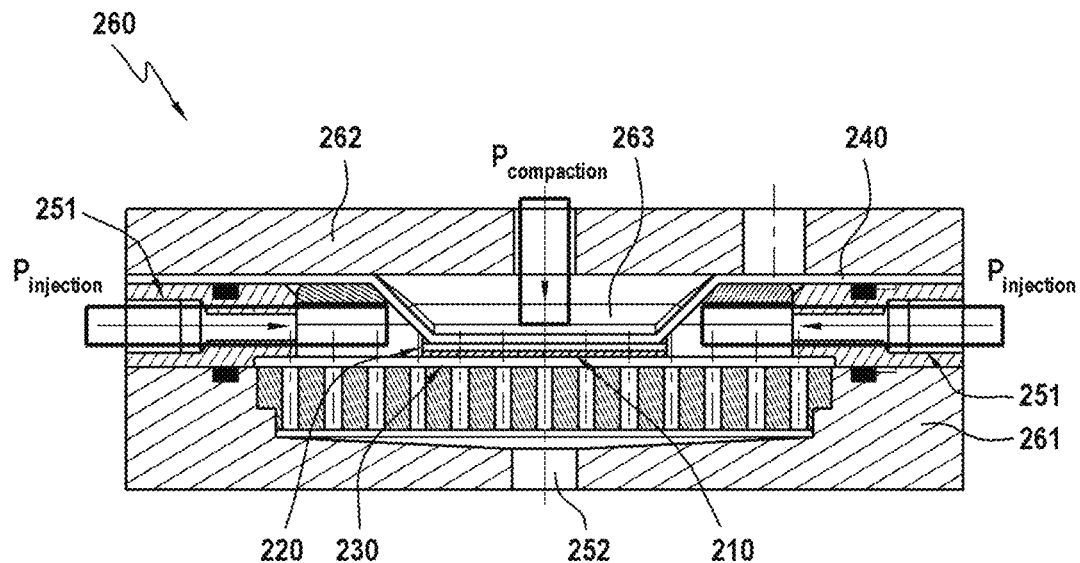
[Fig. 3]
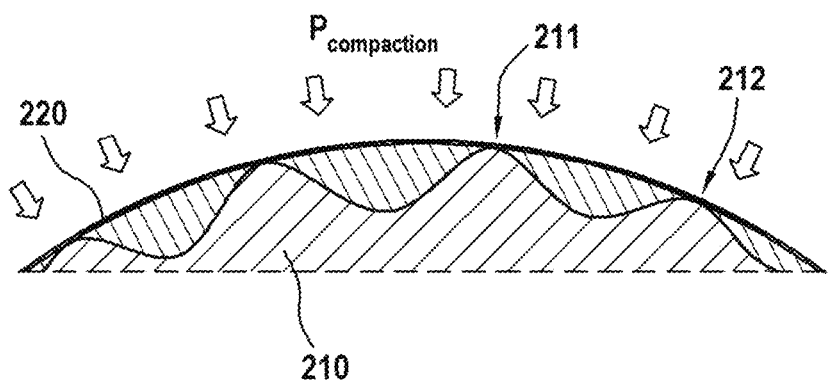

METHOD FOR DENSIFYING A FIBROUS TEXTURE BY INJECTING A SLIP

CROSS-REFERENCE TO RELATED APPLICATIONS

This application is the U.S. National Stage of PCT/FR2023/050442, filed Mar. 28, 2023, which in turn claims priority to French patent application number 2203041 filed Apr. 4, 2022. The content of these applications are incorporated herein by reference in their entireties.

TECHNICAL FIELD

The present invention relates to the general field of manufacturing parts made of ceramic matrix composite (CMC) material, and more particularly to a method for densifying a fibrous texture made of ceramic material comprising a ceramic matrix.

PRIOR ART

The densification of a fibrous texture, that is to say the formation of a ceramic matrix in the fibrous texture, comprises a slip injection step which consists of impregnating the fibrous texture with a suspension of ceramic particles or slip which penetrates into the porosity of the fibrous texture and allows a ceramic matrix to be obtained in the fibrous texture.

To improve the aerodynamic properties of the final part, it is necessary to have a densified fiber texture with a smooth surface. Generally, to obtain a smooth surface, the surface of the densified fiber texture is smoothed by machining, or its surface is smoothed by adding material (extra thickness). However, this leads to additional costs, can reduce the thermomechanical resistance of the material, and above all complicates the manufacturing method of the ceramic matrix composite.

It is therefore desirable to have a new method for densifying a fibrous texture allowing to obtain a densified fibrous preform having a smooth surface without generating excess thickness and without an additional surface machining step.

DISCLOSURE OF THE INVENTION

The invention relates to a method for densifying a fibrous texture made of ceramic material with a ceramic matrix used in injection equipment comprising:
a mold cavity defined between a mold and a counter-mold, the mold cavity defining an internal space, and
a membrane comprising a stiffened zone, the membrane being intended to be placed between a fibrous texture present in the mold cavity and the counter-mold and the stiffened zone of the membrane having a Young's modulus greater than 200 GPa,
the method comprising:
placing a predensified fibrous texture in the mold cavity, the predensified fibrous texture having corrugations on the surface and placing the membrane on the predensified fibrous texture in such a way that the stiffened zone of the membrane is in contact with the peaks of the corrugations of the predensified fibrous texture,
closing the injection equipment by placing the counter-mold on the membrane and applying a compaction pressure to the membrane so as to keep the stiffened zone of the membrane in contact with the peaks of the corrugations of the predensified fibrous texture, and
densifying the predensified fibrous texture by infiltrating a slip into the porosity of the predensified fibrous texture, the slip being injected into the mold chamber laterally to the stiffened zone of the membrane at an injection pressure, such that the difference in pressure between the compaction pressure and the injection pressure is between $0.5\times10^5$ Pa and $6\times10^5$ Pa.

The fact that the stiffened zone has a Young's modulus greater than 200 GPa allows to have a stiffened zone that is sufficiently rigid so that it does not deform during the application of compaction pressure on the membrane and the densification of the fibrous texture.

Thanks to the method of the invention, in particular the fact that the stiffened zone of the membrane is placed at the peaks of the corrugations of the fibrous texture and that the stiffened zone has a Young's modulus greater than 200 GPa, the surface of the fibrous texture can be smoothed during its densification while avoiding the creation of excess thickness (the excess thickness generated by the growth of the matrix is very limited, at most it reaches 0.05 mm). Indeed, the matrix growth, that is to say the densification of the fibrous texture, stops at the stiffened zone of the membrane, which avoids the formation of excess thickness on the surface of the fibrous texture. The volume of the matrix thus formed is therefore restricted up to the highest corrugations of the predensified fibrous texture.

In addition, having a difference in pressure between the compaction pressure and the injection pressure of between 0.5 bar and 6 bar (that is to say between $0.5\times10^5$ Pa and $6\times10^5$ Pa) allows the stiffened zone of the membrane to remain in contact only with the peaks of the corrugations of the fibrous texture. Thus, this stiffened zone does not match the contours of the texture and does not deform during the growth of the matrix in the porosity of the fibrous texture. This difference in pressure range allows to obtain a fibrous preform, that is to say a densified fibrous texture, having a smooth surface.

Moreover, the fibrous texture is already predensified when it is placed in the mold cavity so that it can no longer deform. In other words, the fibrous texture is consolidated before its introduction into the mold cavity. This increases its mechanical strength to prevent it from deforming. This also extends the compaction pressure range, and provides a compaction pressure of between 0.5 bar and 6 bar, which is not possible on a deformable reinforcement.

The injection of the slip laterally to the stiffened zone of the membrane into the mold chamber and into the porosity of the predensified fibrous texture can be carried out at an imposed flowrate or at an imposed pressure such that the difference in pressure between the compaction pressure and the injection pressure is kept constant throughout the injection. When the injection takes place at an imposed flowrate, the pressure profile can be monitored, in particular its rise with the increase in flow resistance during matrix growth, to verify that the difference in pressure between the compaction pressure and the injection pressure remains constant.

According to a particular feature of the invention, the stiffened zone of the membrane is formed by a metal foil placed on a surface of the membrane opposite the fibrous texture.

According to another particular feature of the invention, the metal foil is made of molybdenum or INCONEL® (an alloy of nickel containing chromium and iron).

According to another particular feature of the invention, the metal foil comprises an anti-adhesive coating on a surface facing the fibrous texture.

According to another particular feature of the invention, the method also comprises, before its placement, treating the metal foil with an anti-adhesive coating in the form of a spray or self-adhesive film.

The anti-adhesive coating is for example a polytetrafluoroethylene (PTFE) film.

The presence of an anti-adhesive coating on the metal foil helps to limit material tearing.

According to another particular feature of the invention, the stiffened zone of the membrane is formed by a metal insert or a textile internal to the membrane. In other words, a metal insert or a textile is present between the internal and external surfaces of the membrane. The textile is for example a consolidated textile formed of woven fibers, for example a fine two-dimensional textile, made of carbon or glass which can be integrated during the casting of the membrane. The metal insert is for example an insert made of INCONEL® (an alloy of nickel containing chromium and iron), molybdenum or steel.

According to another particular feature of the invention, the difference in pressure between the compaction pressure and the injection pressure is between $0.5 \times 10^5$ Pa and $1.5 \times 10^5$ Pa (that is to say between 0.5 bar and 1.5 bar).

This allows to improve the smoothness of the surface of the fibrous texture after its densification.

According to another particular feature of the invention, the stiffened zone of the membrane has a thickness of between 50 µm and 100 µm.

According to another particular feature of the invention, the thickness of the stiffened zone of the membrane is greater than 50 µm, for example between 0.05 mm and 0.5 mm, in particular between 0.05 mm and 0.1 mm. This is particularly the case during the densification of a fibrous texture having a flat surface. These materials and/or these thickness ranges for the stiffened zone allow to have a zone that is sufficiently rigid so that this zone does not deform when it is pressed against the fibrous texture and when the matrix grows in the fibrous texture, and sufficiently flexible so that it can match the geometric singularities of the parts and be kept in contact with the peaks of the corrugations of the fibrous texture at all points.

According to another particular feature of the invention, outside its stiffened zone, the membrane has a thickness of between 1.5 mm and 4 mm and a hardness of between 30 Shore A and 60 Shore A.

This allows to have a membrane that applies the compaction pressure evenly over its stiffened zone without hindering the injection of slip.

According to another particular feature of the invention, the method also comprises drying the densified fibrous texture and demolding the densified fibrous texture after densification.

According to another particular feature of the invention, drying is carried out in the mold before demolding or outside the mold after demolding in an oven, in a climatic chamber or by freeze-drying.

Drying in an oven or climatic chamber is, for example, carried out at a temperature of between 40° C. and 80° C. In addition, the oven or climatic chamber preferably has a relative humidity between 40% and 90% to limit cracking.

According to another particular feature of the invention, the slip comprises ceramic fillers with a rate of between 5% and 50% of the volume, for example between 15% and 25% of the volume, a binder with a rate of between 0% and 20% by mass and a plasticizer with a rate of between 0% and 20% by mass.

Ceramic fillers comprise, for example, silicon carbide SiC particles with a d50 of less than 2 µm. The binder is, for example, polyvinyl alcohol (PVA), or polyethylene glycol (PEG) or glycerol. The plasticizer is, for example, polyethylene glycol 200 (PEG 200).

BRIEF DESCRIPTION OF THE DRAWINGS

Other features and advantages of the present invention will emerge from the description given below, with reference to the appended drawings which illustrate exemplary embodiments thereof which are devoid of any limiting character.

FIG. 1 schematically shows a method for densifying a fibrous texture made of ceramic material and with a ceramic matrix according to one embodiment of the invention.

FIG. 2A schematically and partially shows an exploded view of an injection equipment for implementing the densification method according to one embodiment of the invention.

FIG. 2B schematically and partially shows a section of the injection equipment of FIG. 2A.

FIG. 3 schematically and partially shows a metal foil in contact with the peaks of the corrugations of a predensified fibrous texture present in an injection equipment for implementing the invention.

DESCRIPTION OF THE EMBODIMENTS

FIG. 1 schematically shows a method 100 for densifying a fibrous texture made of ceramic material and with a ceramic matrix according to one embodiment of the invention.

FIGS. 2A, 2B and 3 schematically and partially show the injection equipment 260 comprising a fibrous texture 210 for implementing the method 100 illustrated in FIG. 1.

The injection equipment 260 comprises a mold cavity 263 defined between a mold 261 and a counter-mold 262. The mold cavity 263 thus defines an internal space. The injection equipment 260 also comprises a membrane 240 intended to be placed between a fibrous texture 210 present in the mold cavity 263 and the counter-mold 262. The membrane 240 comprises a stiffened zone 220. In this exemplary embodiment, the stiffened zone 220 is formed by a metal foil present on the surface of the membrane 240 facing the fibrous texture 210. In the remainder of the description of these figures, the stiffened zone 220 of the membrane 240 will therefore simply be referred to as "metal foil".

With the exception of the zone comprising the metal foil 220, the membrane 240 may have a thickness of between 1.5 mm and 4 mm. It may have a hardness of between 30 shA and 60 shA. The membrane 240 has, for example, a hardness of 50 shA and a thickness of 4 mm, in order to promote good management of the seals between the counter-mold 262/mold 261 and the membrane 240.

The equipment 260 also comprises two ports 251 for injecting a slip into the mold cavity 263 and an outlet port 252 configured to eliminate a liquid phase from the injected slip. It can also comprise an injection wedge 250 which allows to wedge the membrane 240 and the fibrous texture 210 so as not to hinder the injection of slip and its impregnation into the texture 210.

The injection equipment 260 also comprises a filter element 230 present in the mold cavity 263 under the fibrous texture 210. This filter element 230 is configured to filter a liquid phase of the slip injected into the mold cavity 263.

The liquid phase filtered by the filter element 230 can be eliminated through the outlet port 252.

The densification method 100 comprises placing 110 a predensified fibrous texture 210 in the mold cavity 263 of an injection equipment 260, as well as placing the membrane 240 on the predensified fibrous texture 210. The predensified fibrous texture 210 has corrugations on the surface 211, 212 (shown in FIG. 3). For example, there is up to 0.3 mm difference between the peaks of a corrugation 211, 212 and the lowest point of the corrugation. The metal foil 220 of the membrane 240 is placed on the fibrous texture 210 so that it is in contact with the peaks of the corrugations 211, 212 of the fibrous texture 210. The metal foil 220 is in contact only with the peaks of the corrugations and not with the lowest point located for example 0.3 mm from the peak.

The metal foil 220 is for example made of molybdenum, steel or INCONEL® (an alloy of nickel containing chromium and iron). It has a Young's modulus greater than 200 GPa, and can have a thickness of between 50 µm and 100 µm, for example 100 µm. The metal foil 220 can also comprise an anti-adhesive coating on its surface facing the fibrous texture 210.

Then, the method 100 comprises closing 120 the injection equipment 260 by placing the counter-mold 262 on the membrane. A compaction pressure $P_{compaction}$ is applied to the membrane 240 so that the metal foil 220 remains in contact with the peaks of the corrugations 211, 212 of the predensified fibrous texture 210.

The compaction pressure $P_{compaction}$ is for example applied to the metal foil 220 via the membrane 240 by air pressure or by pressure from another fluid, such as for example a silicone oil.

Finally, the method 100 comprises densifying 130 the predensified fibrous texture 210 by infiltrating a slip into the porosity of the predensified fibrous texture 210. The slip is injected through the injection ports 251 of the injection equipment 260 into the mold cavity 263 laterally to the membrane 240, in particular laterally to the metal foil 220 at an injection pressure $P_{injection}$. The densified fibrous texture thus forms a fibrous preform comprising a matrix.

The values of the injection and compaction pressures, $P_{injection}$, $P_{compaction}$ are defined so that the difference in pressure $\Delta P$ between the compaction pressure and the injection pressure ($\Delta P = P_{compaction} - P_{injection}$) is between 0.5 bar and 6 bar (that is to say in pascals, between $0.5 \times 10^5$ Pa and $6 \times 10^5$ Pa). The difference in pressure $\Delta P$ is for example between 0.5 bar and 1.5 bar, it is for example 1 bar.

The injection pressure $P_{injection}$ can for example be between 3 bar and 20 bar.

The compaction pressure $P_{compaction}$ can for example be between 0.5 bar and 6 bar.

During the injection 130 of the slip, the compaction pressure $P_{compaction}$ and injection pressure $P_{injection}$ values may vary, thus the method 100 may comprise monitoring the difference in pressure $\Delta P$ throughout the injection 130 so as to maintain the difference in pressure $\Delta P$ in the range 0.5 bar to 6 bar, or in a more restricted range, for example between 0.5 bar and 1.5 bar.

The method 100 may also comprise drying the densified fibrous texture 210 and demolding it. The drying may take place before or after demolding the densified fibrous texture. For example, the drying takes place in the mold before demolding, or outside the mold after demolding. When the drying takes place outside the mold, it may be carried out in a climatic chamber, in an oven or else by freeze drying.

The method 100 may also comprise treating the metal foil 220 with an anti-adhesive coating prior to placing 110 the membrane 240 on the fibrous texture 210. Treating the foil 220 with an anti-adhesive coating may be accomplished by spraying the anti-adhesive coating onto the foil 220 or by bonding a self-adhesive film onto the foil 220.

The predensified or consolidated fibrous texture comprises, for example, silicon carbide fibers. The fibrous texture can be produced by stacking plies or folds obtained by two-dimensional weaving. The texture can also be produced directly integrally by three-dimensional weaving. Two-dimensional weaving here means a conventional weaving method by which each weft thread passes from one side to the other of the threads of a single warp layer or vice versa. Three-dimensional weaving here means a weaving for which warp threads pass through several layers of weft threads, or weft threads pass through several layers of warp threads.

The fibrous texture can also be achieved by unidirectional fiber sheets, which can be obtained by automatic fiber placement, or by filament winding.

The fibrous texture can be predensified or consolidated by chemical vapor infiltration (CVI) with the deposition of a boron nitride or pyrolytic carbon interphase, followed by the deposition of a layer of silicon carbide or silicon nitride or a mixture of both (gas phase consolidation). It can also be densified outside the shaper with silicon carbide to protect the texture during the melt infiltration step.

The slip injected during the densification step 130 may comprise ceramic fillers with a rate of between 10% and 50% of the volume, for example between 15% and 25% of the volume, a binder with a rate of between 0% and 20% by mass and a plasticizer with a rate of between 0% and 20% by mass. The ceramic fillers are for example silicon carbide powder with a size d50 of less than 2 µm. The binder is for example polyvinyl alcohol (PVA), polyethylene glycol (PEG) or glycerol. The plasticizer is for example polyethylene glycol 200 (PEG 200). The slip may also comprise a dispersant which may be electrostatic, such as tetraethylammonium (TEAH), or electrosteric, such as polyetherimide (PEI), or steric, such as polyvinylpyrrolidone (PvP). It may also comprise a wetting agent.

According to another embodiment, the stiffened zone of the membrane can be formed by a metal insert or a textile present between the two external surfaces of the membrane.

The metal insert can for example be made of INCONEL® (an alloy of nickel containing chromium and iron), molybdenum or steel.

The textile may for example be a consolidated textile, such as a two-dimensional textile. The textile may be made of carbon or glass fibers and may comprise an epoxy matrix.

The expression "between . . . and . . . " must be understood as including the limits.

The invention claimed is:

1. A method for densifying a fibrous texture made of ceramic material with a ceramic matrix used in injection equipment comprising:
   a mold cavity defined between a mold and a counter-mold, the mold cavity defining an internal space, and
   a membrane comprising a stiffened zone, the membrane being intended to be placed between a fibrous texture present in the mold cavity and the counter-mold, and the stiffened zone of the membrane having a Young's modulus greater than 200 GPa, the method comprising:
   placing a predensified fibrous texture in the mold cavity, the predensified fibrous texture having corrugations on the surface and placing the stiffened zone of the membrane on the predensified fibrous texture in such a way that the stiffened zone of the membrane is in contact with the peaks of the corrugations of the predensified fibrous texture;

closing the injection equipment by placing the counter-mold on the membrane and applying a compaction pressure to the membrane so as to keep the stiffened zone of the membrane in contact with the peaks of the corrugations of the predensified fibrous texture; and densifying the predensified fibrous texture by infiltrating a slip into the porosity of the predensified fibrous texture, the slip being injected into the mold chamber laterally to the stiffened zone of the membrane at an injection pressure such that a difference in pressure between the compaction pressure and the injection pressure is between $0.5 \times 10^5$ Pa and $6 \times 10^5$ Pa.

2. The densification method according to claim 1, wherein the difference in pressure between the compaction pressure and the injection pressure is between $0.5 \times 10^5$ Pa and $1.5 \times 10^5$ Pa.

3. The densification method according to claim 1, wherein the stiffened zone of the membrane has a thickness of between 50 μm and 100 μm.

4. The densification method according to claim 1, wherein the stiffened zone of the membrane is formed by a metal foil placed on a surface of the membrane opposite the fibrous texture.

5. The densification method according to claim 4, wherein the metal foil is made of molybdenum or an alloy of nickel containing chromium and iron.

6. The densification method according to claim 4, wherein the metal foil comprises an anti-adhesive coating on a surface facing the fibrous texture.

7. The densification method according to claim 4, also comprising treating the metal foil with an anti-adhesive coating in the form of a spray or self-adhesive film.

8. The densification method according to claim 1, wherein the stiffened zone of the membrane is formed by a metal insert or a textile internal to the membrane.

9. The densification method according to claim 1, wherein, outside its stiffened zone, the membrane has a thickness of between 1.5 mm and 4 mm and a hardness of between 30 Shore A and 60 Shore A.

10. The densification method according to claim 1, also comprising drying and demolding the densified fibrous texture after densification.

11. The densification method according to claim 10, wherein the drying of the fibrous texture is carried out in the mold before demolding or outside the mold after demolding in an oven, climatic chamber or by freeze-drying.

12. The densification method according to claim 1, wherein the slip comprises ceramic fillers with a rate of between 10% and 50% of the volume, a binder with a rate of between 0% and 20% by mass and a plasticizer with a rate of between 0% and 20% by mass.

* * * * *